United States Patent [19]
Sell

[11] Patent Number: 5,609,229
[45] Date of Patent: Mar. 11, 1997

[54] ACTUATOR ARRANGEMENT FOR A BAND BRAKE

[75] Inventor: Leslie J. Sell, Bothell, Wash.

[73] Assignee: Ingersoll-Rand Company, Woodcliff Lake, N.J.

[21] Appl. No.: 523,713

[22] Filed: Sep. 5, 1995

[51] Int. Cl.$^6$ .................................................. F16D 51/00
[52] U.S. Cl. .................................... 188/77 R; 254/379
[58] Field of Search .............................. 188/77 R, 77 W; 92/80; 254/378, 379

[56] References Cited

U.S. PATENT DOCUMENTS

| | | | |
|---|---|---|---|
| 3,004,390 | 10/1961 | Duffy | 188/77 R |
| 4,425,987 | 1/1984 | Porter | 188/77 W X |
| 4,981,069 | 1/1991 | Matsui | 188/77 R X |

FOREIGN PATENT DOCUMENTS

| | | | |
|---|---|---|---|
| 1178773 | 5/1959 | France | 188/77 R |
| 2-173471 | 7/1990 | Japan | 188/77 R |

*Primary Examiner*—Lee W. Young
*Attorney, Agent, or Firm*—Walter C. Vliet

[57] ABSTRACT

An actuator for a brake band wherein a unique cam and compression yoke arrangement permits location of the cam actuator along an axis parallel to the winch axis thereby permitting its location within the protective zone of the winch and the elimination of exposed spring operated brake actuating arrangements.

7 Claims, 2 Drawing Sheets

ACTUATOR ARRANGEMENT FOR A BAND BRAKE

BACKGROUND OF THE INVENTION

This invention relates generally to an actuator arrangement for a band brake of the type used on a winch drum and more particularly to an actuator wherein the components are completely enclosed and the entire assembly is mounted neatly on the winch frame. Current known methods of actuating band brakes on winches consist of an air or hydraulic long stroke cylinder, mounted vertically outside of the winch frame, the rod end of the cylinder being connected to a toggle lineage that pulls the two halves of the band together when the cylinder retracts. External or internal springs are used to cause the cylinder to retract while air or hydraulic pressure is used to extend the cylinder against the springs and release the band brake. These arrangements increase the envelope size of the winch and the moving components, which are open to the elements.

The foregoing illustrates limitations known to exist in present devices and methods. Thus it is apparent that it would be advantageous to provide an alternative directed to overcoming one or more of the limitations set forth above. Accordingly, a suitable alternative is provided including features more fully disclosed hereinafter.

SUMMARY OF THE INVENTION

Contrary to parent known methods the actuator components of the present invention are completely enclosed and the entire assembly is mounted neatly on the winch frame. To open and close the brake band, the actuator utilizes a cam profile tailored to suit the energizing spring characteristics. In one aspect of the present invention this is accomplished by providing an actuator arrangement for a brake band comprising a brake band orientated in one plane perpendicular to a rotating drum axis; a linear actuating means including a linear projecting cam means for deploying the brake band characterized by; and the linear actuating means and the cam means being projected along a path parallel to the drum axis to intercept a compression yoke at a circumferential point of the brake band to cause the brake band to contract and apply braking force.

The foregoing and other aspects will become apparent from the following detailed description of the invention when considered in conjunction with the accompanying drawing figures:

BRIEF DESCRIPTION OF THE DRAWING FIGURES

DETAILED DESCRIPTION

Figure 1:
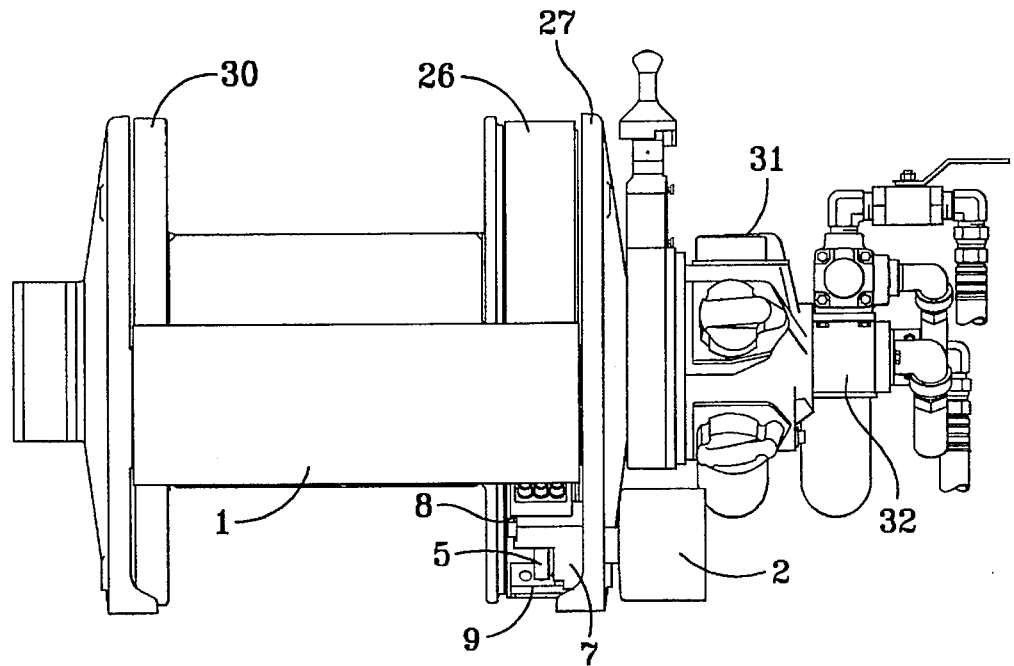
FIG. 1 shows a front view of a winch including an actuator for a brake band according to the present invention.

FIG. 1 depicts a side elevation view of a winch generally designated by the reference numeral 1 having a brake band 26 located on the right side of the drum. The tension end of brake band 26 is connected to bracket 7 at connection point 8. The energizing end of brake band 26 is attached to plunger 5 at attachment point 9. An actuating cylinder 2 is screwed into bracket 7 which is attached to the inside of right hand winch and frame 27. The entire actuator assembly occupies existing space at the lower left hand corner of winch end frame 27 and in this position the small amount of movement of the energizing side of the brake band 26 is concealed from the winch operator. In addition, the actuating cylinder 2 is located within the diametral confines of the winch drum 30, the motor 31 and the associated air supply valving 32.

Figure 2:
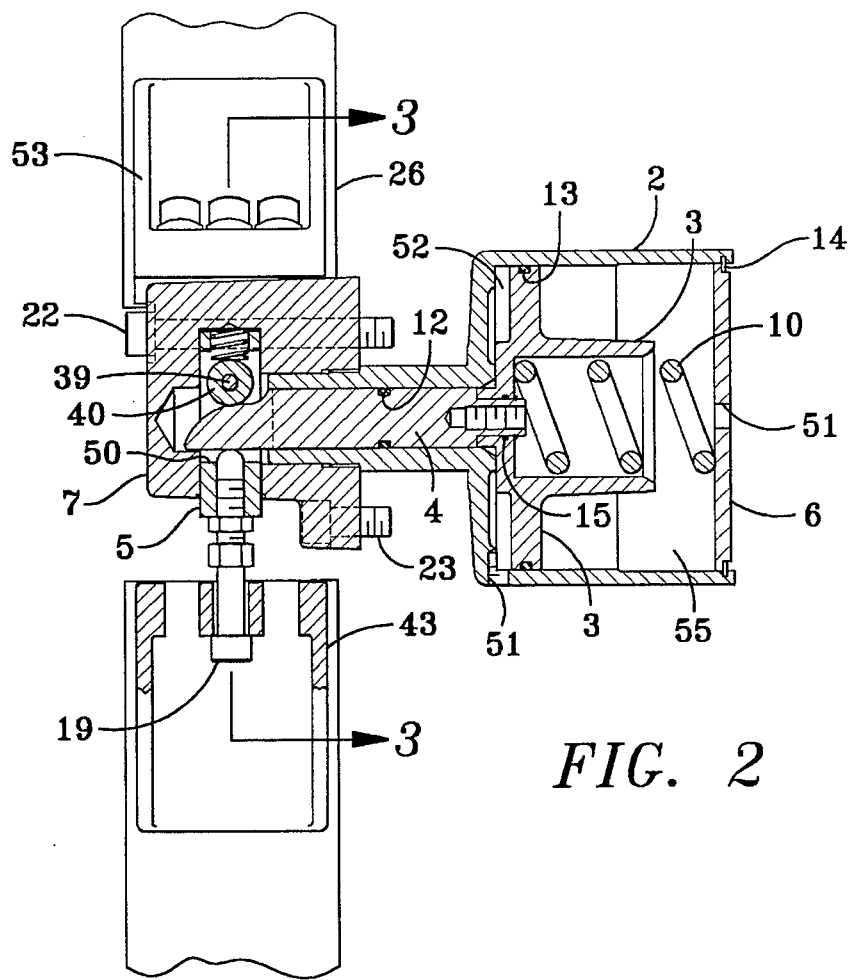
FIG. 2 shows a partially sectioned side view of the actuating mechanism and cam according to the present invention taken at Section 2—2 of FIG. 3.
Figure 3:
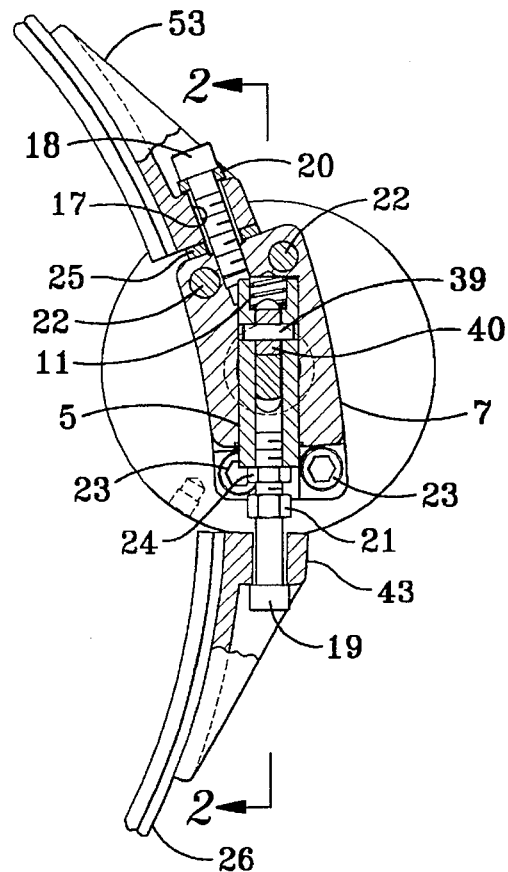
FIG. 3 shows a partially sectioned end view of the actuator mechanism taken at Section 3—3 of FIG. 2.
Figure 4:
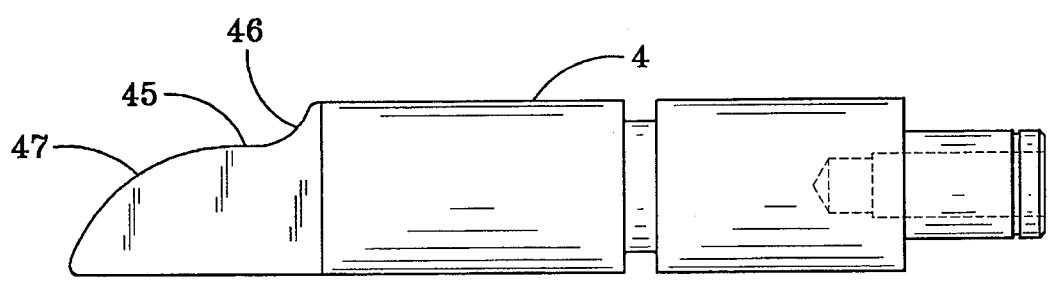
FIG. 4 shows an elevation view of the actuator cam showing the cam profile according to the present invention.
Figure 5:
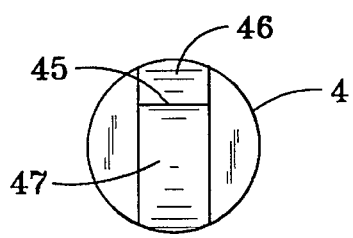
FIG. 5 is an end view elevation of the end of the actuator cam.

Referring now to FIGS. 2 and 3, bracket 7 which is secured in winch frame 27 by means of bolts 22 and 23 carries a cylindrical housing 2 which houses piston 3 which is spring loaded to the left as shown in FIG. 2 against cover 6 and retainer 14 by means of a spring 10. The piston or actuator rod 4 attached to piston 3 at joint 15 has a flattened cam area 45 that is shaped to a cam profile having a convex portion 47 and a concave portion 46, as best seen in FIGS. 4 and 5. A plunger cylinder or compression yoke 5 is provided with a generally rectangular slotted hole 50 in which a roller 40 is carried on cross pin 39. The flattened area 45 on piston rod 4 passes through the slotted hole in plunger 5 such that the cam profile 45 rides on roller 40.

The energizing end of brake band 26 is attached to plunger 5 by adjusting screw 19 passing through a bore 16 in bracket 43. The tension end of brake band 26 is attached by screws 18 through bore 17 in bracket 53 and washers 20 and 25 to bracket 7. The plunger 5 is slidably located in bracket 7 and is urged downward against the cam face by compression spring 11.

In the position shown in FIG. 2 adjusting screw 19 is tightened by rotation in threaded nut 24 attached to plunger 5 until the reaction between the energizing side of the band and the plunger 5 acting through roller 40 against the cam face 45 forces piston 3 back slightly against spring 10. The position of adjusting screw 19 is secured by lock nut 21. At this point the load on the energizing end of the band will be sufficient to develop the desired brake force. Pressure applied to piston 3 in cylinder 2 at port 51 causes piston 3 to retract piston rod 4 sufficiently until roller 40 is contacting the cam face at a point close to the tip. At this point plunger 5 has extended downwardly from bracket 7 approximately ½ inch causing the energizing side of the band to slacken by increasing its effective circumference and the brake to release.

Brackets 43 and 53 distribute the braking force to the brake band at the energizing end of the brake band and the tension end of the brake band respectively.

Piston 3 moves in cylinder 2 in response to air or pneumatic fluid pressure applied to port 51. Seal 13 on the piston 3 and seal 12 on the plunger 5 seal the actuating chamber 52 during operation. A vent 61 located in the bottom end of the piston chamber and may also be used as a source of pressurizing the return chamber 55 as a means of supplementing or replacing the return spring 10.

As will be appreciated by one skilled in the art, the cam profile can be tailored to suit various operating conditions and units. The actuator arrangement requires only a single point attachment to the winch frame and eliminates hazardous external moving parts. In addition, the actuator arrangement can be permanently lubricated and sealed from the elements if desired.

Having described my invention in terms of a preferred embodiment, I do not wish to be limited in the scope of my invention except as claimed.

What is claimed is:

1. An actuator adapted to be attached to a brake band orientated in one plane perpendicular to a rotating drum rotating about a drum axis comprising:

a linear actuating means including a linear projecting cam means for deploying said brake band;

said linear actuating means and said cam means being projected along a linear path parallel to said drum axis to intercept a compression yoke at a circumferential point of said brake band to cause said brake band to contract and apply braking force;

said compression yoke further comprises a yoke body attached to a winch frame for the rotating drum and one end of said brake band and said yoke body being further provided with a plunger bore to receive a reciprocating cylindrical plunger attached to a second end of said brake band and said plunger being further provided with a generally rectangular cross bore for receiving said cam means.

2. An acutator for a brake band according to claim 1 wherein:

said actuator actuates the brake band for said rotating drum further comprising a winch drum.

3. An actuator for a brake band according to claim 1 wherein:

said linear actuating means further comprises an air operated piston actuator rod and said cam means is formed on the end of said rod.

4. An actuator for a brake band brake according to claim 3 wherein:

said piston actuation rod is attached to a piston operating in a cylinder in axial alignment with said actuator rod and said piston actuator rod operates along an axis parallel to said rotating drum axis.

5. An actuator for a brake band according to claim 1 wherein:

said cam means is formed with a concave and a convex profile to effect braking action movement by said concave profile in one advanced projected position and holding action by said convex profile in a second further advanced position.

6. An actuator for a brake band according to claim 1 wherein:

said rectangular cross bore is further provided with a roller for interaction with said cam means.

7. An actuator for a brake band according to claim 1 wherein:

said plunger operates to withdraw within said plunger bore in response to said cam means operating between a plunger bore roller and said bracket to cause a circumferential reduction of the brake band.

* * * * *